US010998778B2

(12) United States Patent
Long et al.

(10) Patent No.: US 10,998,778 B2
(45) Date of Patent: May 4, 2021

(54) MODULAR MOTOR ASSEMBLY

(71) Applicant: Wisk Aero LLC, Mountain View, CA (US)

(72) Inventors: Geoffrey Alan Long, Montara, CA (US); Justin Char, San Jose, CA (US); Robert Wayne Moore, Fremont, CA (US); Laura Weeks Shane, Palo Alto, CA (US); Diederik Marius, Mountain View, CA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

(21) Appl. No.: 16/528,138

(22) Filed: Jul. 31, 2019

(65) Prior Publication Data

US 2020/0028389 A1     Jan. 23, 2020

Related U.S. Application Data

(63) Continuation of application No. 15/893,383, filed on Feb. 9, 2018, now Pat. No. 10,418,868.

(51) Int. Cl.
*H02K 1/18*     (2006.01)
*H02K 1/30*     (2006.01)
(Continued)

(52) U.S. Cl.
CPC ............. *H02K 1/182* (2013.01); *H02K 1/30* (2013.01); *H02K 5/22* (2013.01); *H02K 7/14* (2013.01);
(Continued)

(58) Field of Classification Search
CPC ........ H02K 16/00–16/04; H02K 1/182; H02K 5/22; H02K 16/02; H02K 15/028;
(Continued)

(56) References Cited

U.S. PATENT DOCUMENTS 2,006,172 A * 6/1935 Klappauf ............... H02K 16/00
                                                                         310/166
5,977,684 A * 11/1999 Lin ........................ H02K 21/12
                                                                         310/178
(Continued)

OTHER PUBLICATIONS

U.S. Appl. No. 15/893,383, "Final Office Action" dated Nov. 26, 2018, 17 pages.
U.S. Appl. No. 15/893,383, "Non-Final Office Action" dated Jun. 4, 2018, 15 pages.
U.S. Appl. No. 15/893,383, "Notice of Allowance" dated May 6, 2019, 9 pages.

*Primary Examiner* — Thomas Truong
(74) *Attorney, Agent, or Firm* — Kilpatrick Townsend & Stockton LLP

(57) ABSTRACT

Embodiments of a modular motor assembly are disclosed. In some embodiments, a motor comprises a plurality of modular magnetic units, where each of the modular magnetic units includes at least one rotor and at least one stator. The motor further comprises a plurality of structural segments each adapted to support a stator of a corresponding one of the modular magnetic units, where each of the structural segments interlocks with a next structural segment to form a stack. A method of manufacturing a motor includes arranging a selected number of modular magnetic units, coupling the selected number of modular magnetic units to a shaft, coupling the selected number of modular magnetic units to respective structural segments, and forming electrical connections to apply three-phase voltage to stator windings of the modular magnetic units.

17 Claims, 7 Drawing Sheets

(51) Int. Cl.
*H02K 5/22* (2006.01)
*H02K 7/14* (2006.01)
*H02K 15/02* (2006.01)
*H02K 16/02* (2006.01)
*B64C 27/08* (2006.01)
*B64D 35/02* (2006.01)

(52) U.S. Cl.
CPC ............ *H02K 15/028* (2013.01); *H02K 16/02* (2013.01); *B64C 27/08* (2013.01); *B64D 35/02* (2013.01); *H02K 2213/09* (2013.01)

(58) Field of Classification Search
CPC ........ H02K 7/14; H02K 1/30; H02K 2213/09; B64D 35/02; B64C 27/08
USPC .................................. 310/112, 114, 71, 268
See application file for complete search history.

(56) References Cited

U.S. PATENT DOCUMENTS

| | | | |
|---|---|---|---|
| 6,002,193 A | 12/1999 | Canini et al. | |
| 10,418,868 B1 | 9/2019 | Long et al. | |
| 2005/0285467 A1* | 12/2005 | Shimizu | H02K 1/20 310/156.35 |
| 2006/0016929 A1 | 1/2006 | Mohr | |
| 2012/0074798 A1* | 3/2012 | Bywaters | H02K 1/185 310/54 |
| 2015/0229194 A1* | 8/2015 | Sromin | H02K 21/24 310/156.07 |

* cited by examiner

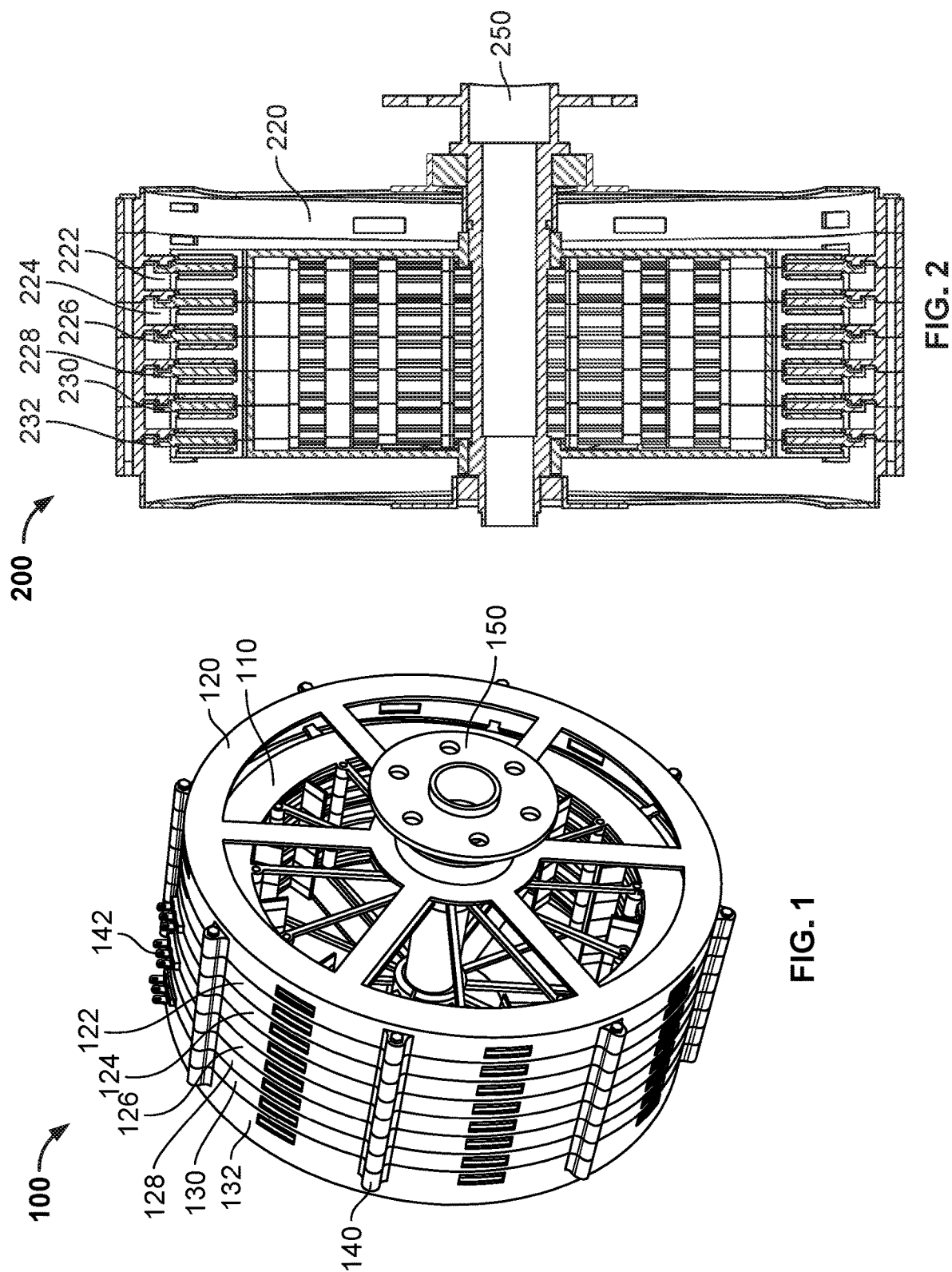

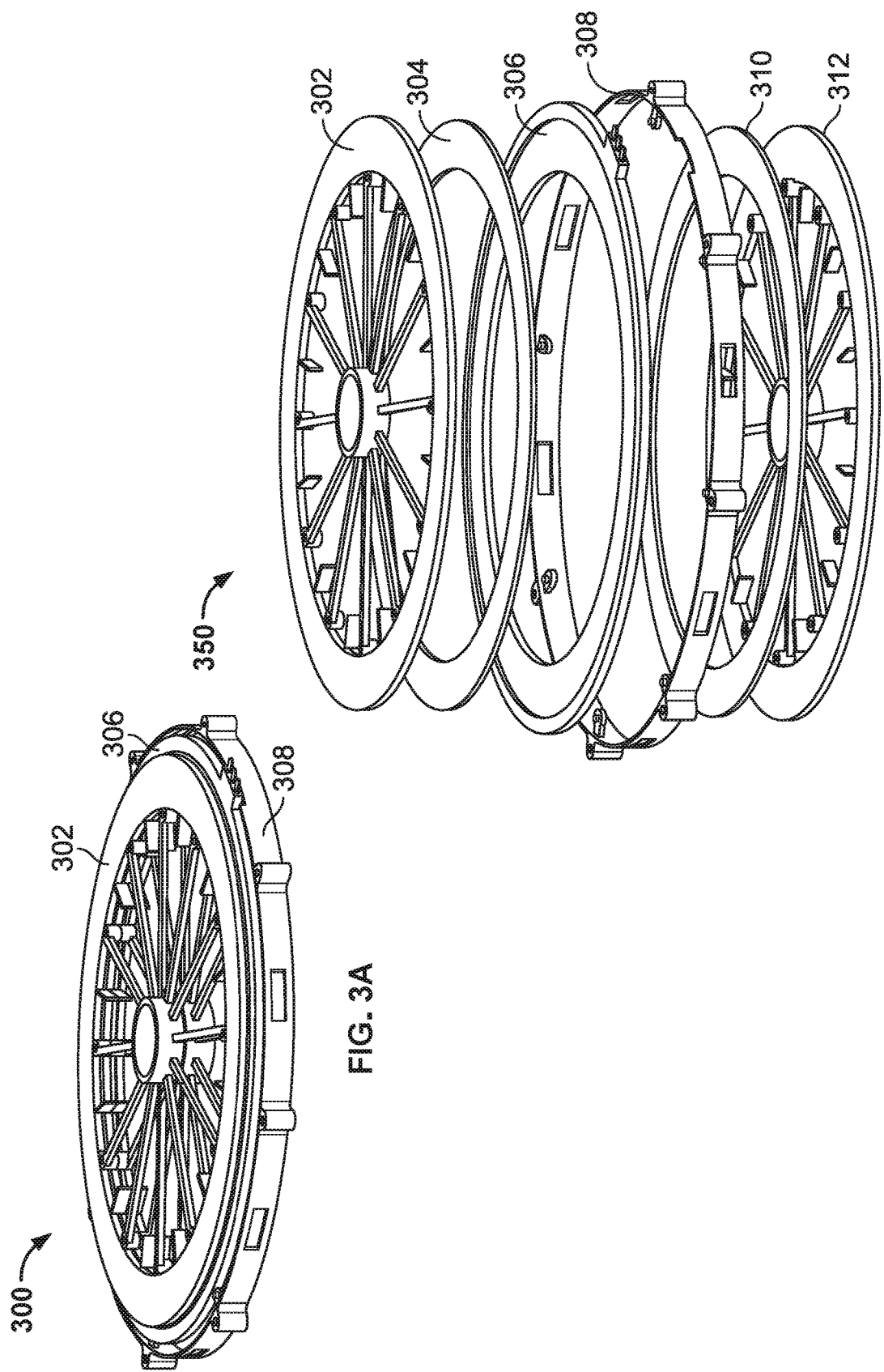

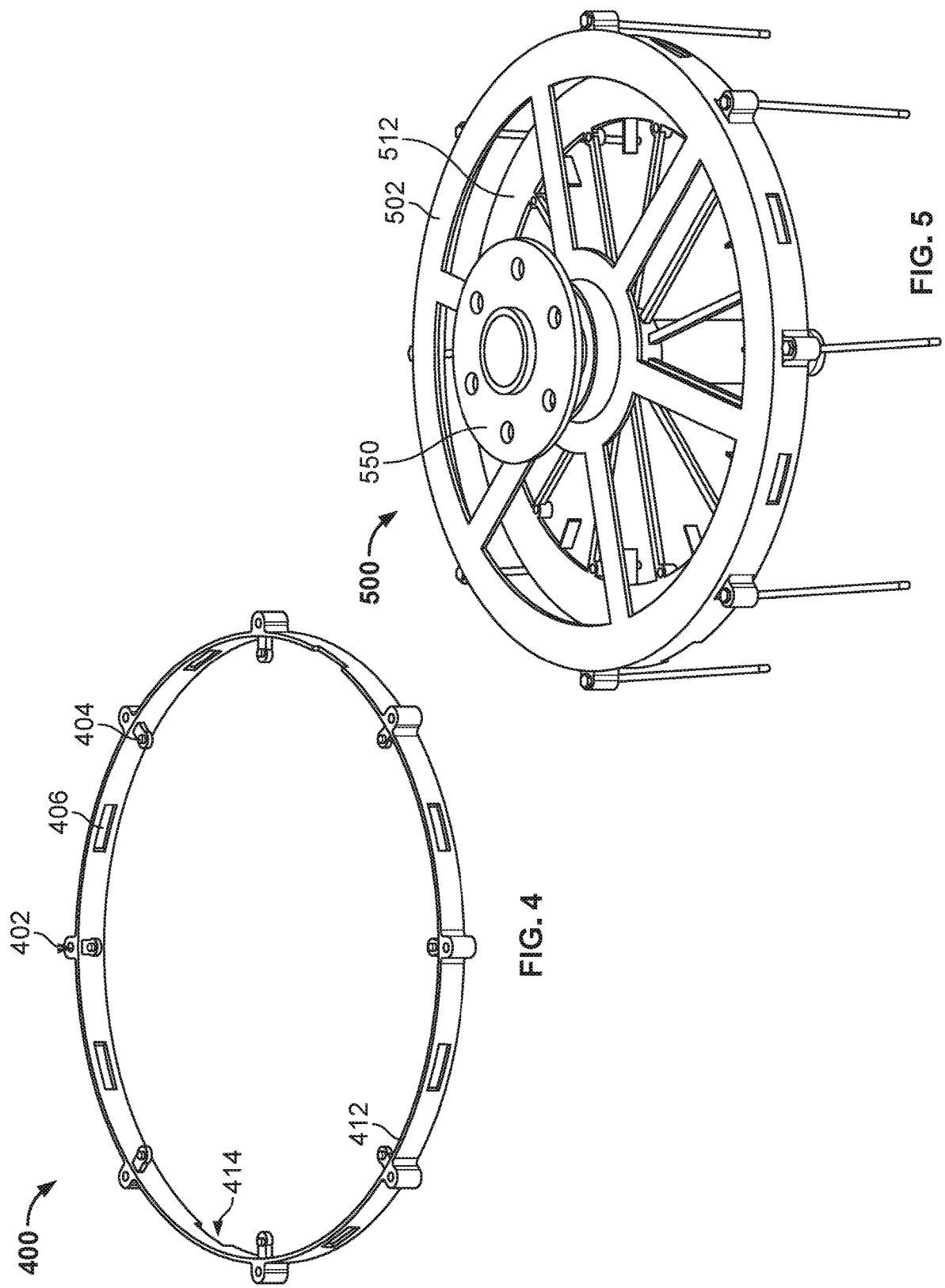

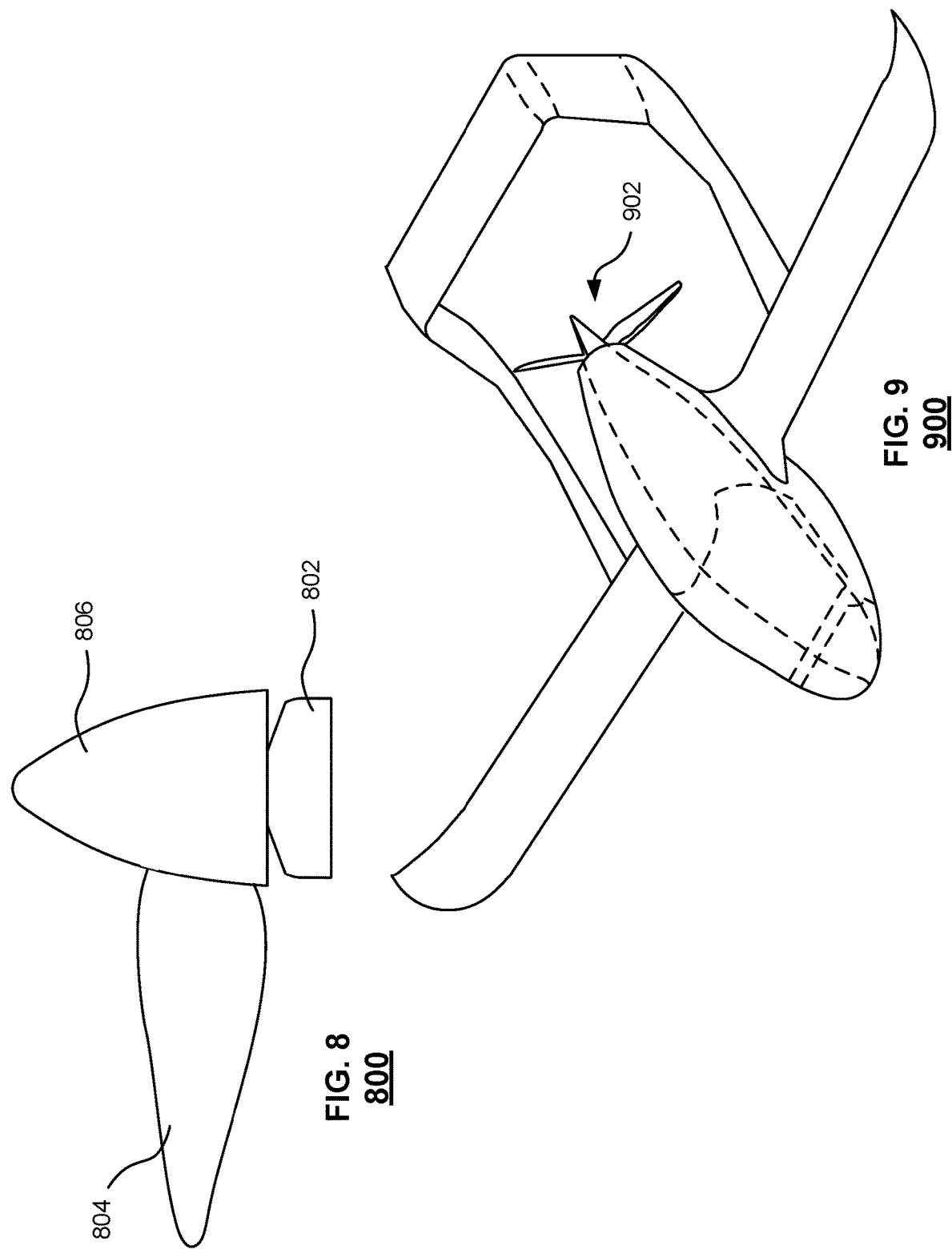

1000

MODULAR MOTOR ASSEMBLY

CROSS REFERENCE TO OTHER APPLICATIONS

This application is a continuation of co-pending U.S. patent application Ser. No. 15/893,383 entitled MODULAR MOTOR ASSEMBLY filed Feb. 9, 2018 which is incorporated herein by reference for all purposes.

BACKGROUND OF THE INVENTION

Electric motors operate by converting electrical energy to mechanical energy. Depending on the application for the electric motor (e.g., lawn mower, land vehicle, aircraft, etc.), the number of magnetic units making up the electric motor can be varied to provide the desired amount of mechanical power. Motors are typically custom-made for specific uses. Parts may need to be replaced during the lifetime of the motor. The manufacture and maintenance of a motor can be costly because of the custom-made nature of the motor, diversity of parts used, and the qualification of parts. Manufacturing and maintenance costs may escalate if the motor is especially complex and has many unique parts.

BRIEF DESCRIPTION OF THE DRAWINGS

Various embodiments of the invention are disclosed in the following detailed description and the accompanying drawings.

FIG. 1 is a perspective view of an embodiment of a modular motor assembly.

FIG. 2 is cross-sectional side view of an embodiment of a modular motor.

FIG. 3A is a cross-sectional view of an embodiment of a magnetic unit for a modular motor assembly.

FIG. 3B is an exploded view of an embodiment of a magnetic unit for a modular motor assembly.

FIG. 4 shows an example of a structural segment for a modular motor assembly according to embodiments of the present disclosure.

FIG. 5 is a block diagram illustrating an embodiment of an endplate for a modular motor assembly.

FIG. 8 is a block diagram illustrating an embodiment of a motor and fan assembly 800 in which a modular motor is provided.

FIG. 9 is a block diagram illustrating an example of an aircraft in which a modular motor assembly is provided.

DETAILED DESCRIPTION

Figure 6C:
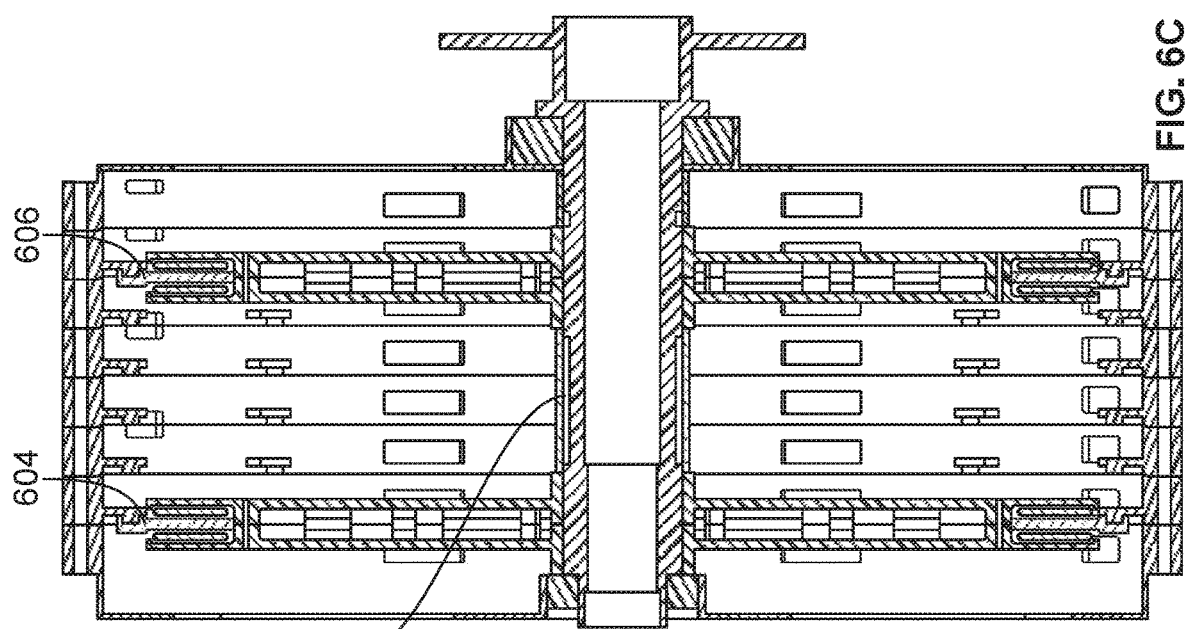
FIG. 6C is cross-sectional side view of an example of shaft spacer placement in a modular motor assembly according to embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An electric motor may include electrical windings and be adapted to generate a magnetic field that interacts with the permanent magnets or additional electrical windings to produce torque. The motor is usually custom-designed to be specific size and to output a desired amount of power. For example, different shafts and housings are machined to be a specific length according to specifications of the motor.

Custom-made motors often have many different types of parts (sometimes called "components"). The parts may be made by different manufacturers. A part needs to be qualified to determine compatibility with mechanical devices and monitor the quality of the part. This ensures that components made by different manufacturers are compatible with the mechanical devices. The qualification of parts can be a lengthy and bureaucratic process. This can slow the development and maintenance of motors and the vehicles in which they are used. Additionally, the manufacturing of many unique parts sometimes requires tooling or equipment specific to individual parts, increasing cost. One way to improve the manufacture and maintenance of motors is to reduce the number of unique parts used.

Embodiments of a modular motor assembly are described. The motor can be constructed from a series of modular magnetic units that have a modular structure comprising structural segments held together by interlocking features and connections such as bolts. In various embodiments, a motor includes a plurality of modular magnetic units, wherein each of the modular magnetic units includes at least one rotor and at least one stator, and a plurality of structural segments each adapted to support a stator of a corresponding one of the modular magnetic units, where each of the structural segments interlocks with a next structural segment to form a stack. At build time, a variable number of modular magnetic units can be combined to make a motor have two or more stages. For instance, the modular magnetic units can be identical or substantially identical in that the modular magnetic units share a common part. This has the benefit of, among other things, needing fewer part for a motor.

FIG. 1 is a perspective view of an embodiment of a modular motor assembly. Motor 100 is a single stack motor with six magnetic units. The motor 100 includes magnetic units 110, structural segments 120-132, and shaft 150. In contrast to conventional motors, in various embodiments, the complex portions of the shaft is made common by means of common ends linked by a variable number of spacers. This reduces the cost of manufacturing and maintaining the motor because fewer different parts may be used.

Each of the magnetic units 110 is adapted to generate force when the unit's magnetic field interacts with its winding currents. In this view, a few of the magnetic units 110 are visible through the windows formed by the spokes of end piece structural unit 120. The outermost magnetic unit is 110. The magnetic units are more fully described with respect to FIG. 2, in which all of the magnetic units are visible.

Each of the structural segments 120-132 is adapted to provide support for the magnetic units. The structural segments collectively form a hollow tube (sometimes called "canister") adapted to hold one or more magnetic units inside the cylinder formed by the structural segments. In various embodiments, the structural segments include end structural segments 120 and 132 (which may or may not be identical to each other) and internal structural segments 122-130. The internal structural segments may be substantially identical to each other. The structural segments may be coupled to form an opening, e.g., for electrical connectors 142. Referring to FIG. 4, area 414 forms half of an opening when two structural segments are coupled, a window is formed through which electrical connections may be routed. The structural segments can be coupled to form a stack by running a pin through pin holes aligned to form long channel 140.

An example of an internal structural segment is more fully described herein with respect to FIG. 4. An example of an end structural segment is more fully described herein with respect to FIG. 5. In some embodiments, the structural units may be mechanically coupled to each other while the magnetic units are removable from motor 100.

Returning to FIG. 1, the shaft 150 is adapted to transfer torque generated by the magnetic units to the canister. For example, one or more magnetic units may be coupled to the shaft. In some embodiments, a select few of the rotors in the magnetic units may be fixed to the shaft. In some embodiments, the portion of the magnetic unit coupled to the shaft is connected via splines in the motor. Additional units may couple to one another using pins and threaded fasteners. The shaft 150 is more fully described herein with respect to FIG. 2. Space between magnetic units may be provided by means of one or more shaft spacers. An example of a shaft spacer is shown in FIG. 6.

In various embodiments, one or more electrical connections may be provided. For example, electrical connector 142 allows the magnetic unit to be connected to a power source. The structural segments may be structured to accommodate the electrical connections as more fully explained herein with respect to FIG. 4.

Motor 100 is a multi-stack motor with six magnetic units. In some embodiments (not shown), shaft spacers may be provided vary shaft length by making a modular shaft. Shaft spacers may be used to separate one stack of one or more magnetic units from another stack of one or magnetic units. This allows a desired amount of energy to be provided by selecting an appropriate number of magnetic units and sizing the motor as desired to meet power requirements of the vehicle in which the motor is provided. In some embodiments, a motor having a relatively long shaft may comprise a few magnetic units by using spacers. In various embodiments a four-stack motor may be made by shortening the shaft relative to the one pictured in FIGS. 1 and 2 or making a split stack motor of substantially the same length as the motor of FIGS. 1 and 2 by replacing two of the magnetic units with a spacer.

FIG. 2 is a side view of an embodiment of a modular motor. Motor 200 includes magnetic units 222-232, structural segment 220, and shaft 250.

Each of the structural segments 220 is adapted to support one or more corresponding magnetic units. For example, the structural segments may surround a corresponding magnetic unit. The structural segments are more fully described with respect to FIG. 1.

Each of the magnetic units 222-232 is adapted to generate torque when the magnetic unit's magnetic field interacts with its winding currents. In this example, the six magnetic units 222-232 are stacked. Variable torque may be generated depending on sizing of the magnetic units and number of magnetic units are provided in the motor. Typically, more torque is generated when a motor has more magnetic units. In various embodiments, magnetic units may be provided in a stacked manner as shown. Torque may be transferred via the shaft to the load to be driven. Here, torque may be transferred from the magnetic units via spokes to shaft 250. Torque may be transferred from the magnetic units to the structural segments 220. If a plurality of magnetic units are provided, the collective torque may be transferred via the shaft to power a vehicle or device in which the motor is provided. Example applications for motor 100 are shown in FIGS. 8 and 9. In various embodiments, an end piece magnetic unit may be structured differently from an internal magnetic unit. An example of a magnetic unit is shown in FIGS. 3A and 3B.

Shaft 250 accommodates a variable number of magnetic units by varying the length of one feature. In this example, the shaft 250 is pictured as being substantially uniform in diameter through the length of the motor. In some embodiments, the shaft may instead have a varying diameter. An example of a shaft with a variable diameter is shown in FIG. 7. In this example, no shaft spacers are provided because motor 200 is a single stack motor. In some embodiments, one or more magnetic units may be connected (e.g., bolted to the shaft).

FIG. 3A is a cross-sectional view of an embodiment of a magnetic unit for a modular motor assembly. The magnetic unit 300 includes rotor housing 302, stator 306, rotor (not shown), and stator housing 308. The rotors may be implemented by a magnetic array such as a Halbach array. Adjacent magnetic arrays may be attached to a same physical piece but need not interact magnetically. For example, the magnetic arrays may be magnetically aligned. This allows, in various embodiments, the magnetic units to be removed from the motor and the remaining magnetic units would be compatible with one another. The example upper rotor housing is shown with an output shaft on top.

The stator 306 may include wire winding mounted to the stator housing. For example, the stator may include a wire winding encased in fiberglass. In some embodiments, the stator housing may be different from the one shown in FIG. 3A. The stator may have pockets machined into it to accommodate pins of a structural segment such as pin 404 of FIG. 4. The stator may be removably coupled to the structural segment. For example, the pockets of the stator allow the stator to sit (sometimes referred to as "float") on the pins of the structural segment. The coupling of the stator to the structural segment allows torque to be transferred to the canister formed by the structural segments. The floating stator transfers torque without needing to be fixedly coupled to adjacent components. A plurality of bearings may control motion between the upper rotor and the stator and the lower rotor and the stator.

FIG. 3B is an exploded view of an embodiment of a magnetic unit for a modular motor assembly. The magnetic unit includes upper rotor housing 302, upper magnet array 304, stator 306, stator housing 308, lower magnet array 310, and lower rotor housing 312. Each of the components are like their counterparts in FIG. 3A unless otherwise described.

In various embodiments, internal magnetic units differ from end piece magnetic units. An internal magnetic unit includes the components (including two magnet arrays 304, 310) shown in FIG. 3B, while an end piece magnetic unit includes a single magnet array. Referring to FIG. 3B, an end piece magnetic unit, in various embodiments, comprises rotor housing 302, magnet array 304, stator 306, and stator housing 308. A single stack motor may be formed by joining two end magnetic units. Together, the two end magnetic units comprise two magnet arrays with a stator in between.

As mentioned above, an internal magnetic unit has a pair of magnet arrays. Referring to FIG. 3B, an internal magnetic unit comprises upper rotor housing 302, upper magnet array 304, stator 306, stator housing 308, lower magnet array 310, and lower rotor housing 312. In some embodiments, the rotor housing and stator housing may be different from the housing 302, 308, and 312.

FIG. 4 shows an example of a structural segment for a modular motor assembly according to embodiments of the present disclosure. In particular, ring-shaped structural segment 400 is an example of an internal structural segment for a modular motor. The structural segment 400 may be arranged to surround internal magnetic units that are provided between two end structural segments such as the one shown in FIG. 5.

Structural segment 400 may be adapted to couple to adjacent structural segments by a lip and/or a pinhole. For example, the structural segments may be structured to interlock, fit into adjacent structural segments, mate, have features for receiving a next structural segment, or the like. Lip 412 may be structured to connect to an adjoining structural unit. For example, lip 412 may be structured to mate with adjacent structural segments such that when stacked, a group of structural segments are locked into place and are not easily displaced.

Pinhole 402 may be adapted to receive a connection such as a pin to an adjoining structural segment. For example, a pin may be provided along the length of the motor through each of the pinholes in the structural segments to fix the structural segments in place. Referring to FIG. 1, a pin is inserted through pinholes in each of structural segments 120-132 to join these structural segments at 140.

Structural segment 400 may be adapted to accommodate electrical connections. As shown, structural segment 400 has an interrupted lip. For example, portion 414, which is a cavity may align with a cavity of another structural segment to form an area through which wiring can be extended. In one aspect, the tooth-type lip may facilitate electrical connections by providing a clearance for wiring.

Pin 404 is adapted to facilitate attachment of a stator of a magnetic unit to the structural segment. As more fully described with respect to FIG. 3, a stator may have pockets adapted to rest on the pins 404, thereby removably coupling the stator to the structural segment. The floating stator may transfer torque to the canister via this position with respect to the structural segment.

One or more windows 406 may be provided in the structural segment. In one aspect, window 406 may allow air flow. For example, heat generated by the magnetic units may be dissipated through the window 406. In another aspect, window 406 may facilitate monitoring of the motor. For example, expected operation such as spinning of the magnetic units may be observed through the windows provided along the outside wall of the structural segments. FIG. 5 is a block diagram illustrating an embodiment of an endplate for a modular motor assembly. In particular, structural segment 500 is an example of an end piece for a modular motor. End structural segment 500 is configured with one or more spokes 512 (here, six spokes) to provide support for the motor and support the internal pieces (magnetic unit). The spokes support bearings that allow a shaft 550 to rotate with respect to the circumference 502 of the structural segment.

Figure 6B:
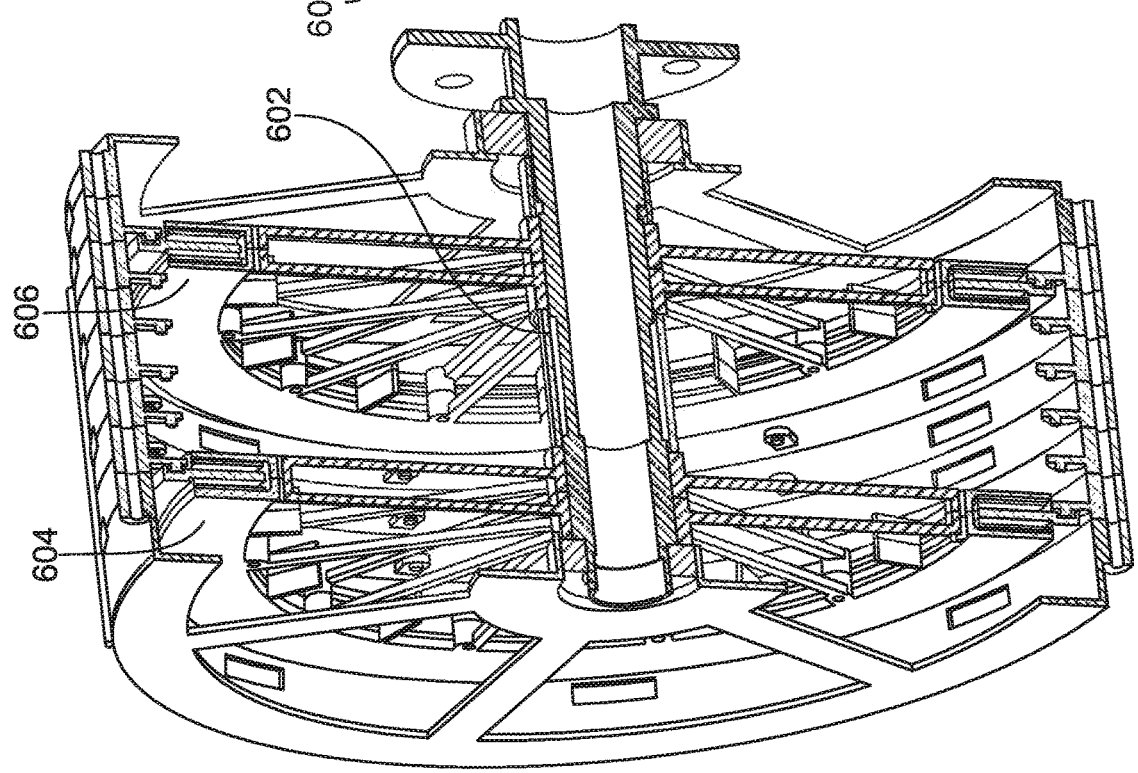
FIG. 6B is a perspective cross-sectional view of an example of shaft spacer placement in a modular motor assembly according to embodiments of the present disclosure.
Figure 6A:
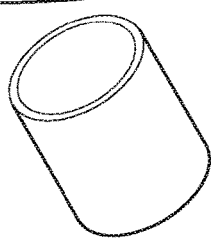
FIG. 6A shows an example of shaft spacer for a modular motor assembly according to embodiments of the present disclosure.

FIG. 6A shows an example of shaft spacer for a modular motor assembly according to embodiments of the present disclosure. The shaft spacer can be interlocking and held together by a tension bolt or other means. In some embodiments, several shaft spacers can be stacked to create a larger space between magnetic units. In some embodiments, the shaft can be secured with a tie bolt at an end piece. For example, center pieces may have an interlocking coupling and may be secured by providing a tie bolt running through clamps to the end piece. The shaft spacers may fill the space created when magnetic units are removed. In various embodiments, each rotor section of a magnetic unit bolts to the next and only a select few (e.g., end units) bolt to the shaft. This facilitates removal of magnetic units because they can be de-coupled from adjacent magnetic units without needing to also remove them from the shaft.

A motor of a specified dimension may be made with a variable number of magnetic units by replacing the space created by the vacated magnetic units with shaft spacers. FIG. 6B is a perspective cross-sectional view of an example of shaft spacer placement in a modular motor assembly according to embodiments of the present disclosure. FIG. 6C is cross-sectional side view of an example of shaft spacer placement in a modular motor assembly according to embodiments of the present disclosure. In the examples of FIGS. 6B and 6C, shaft spacer 602 is placed hear the center of the shaft to separate unit 604 from unit 606.

Figure 7A:
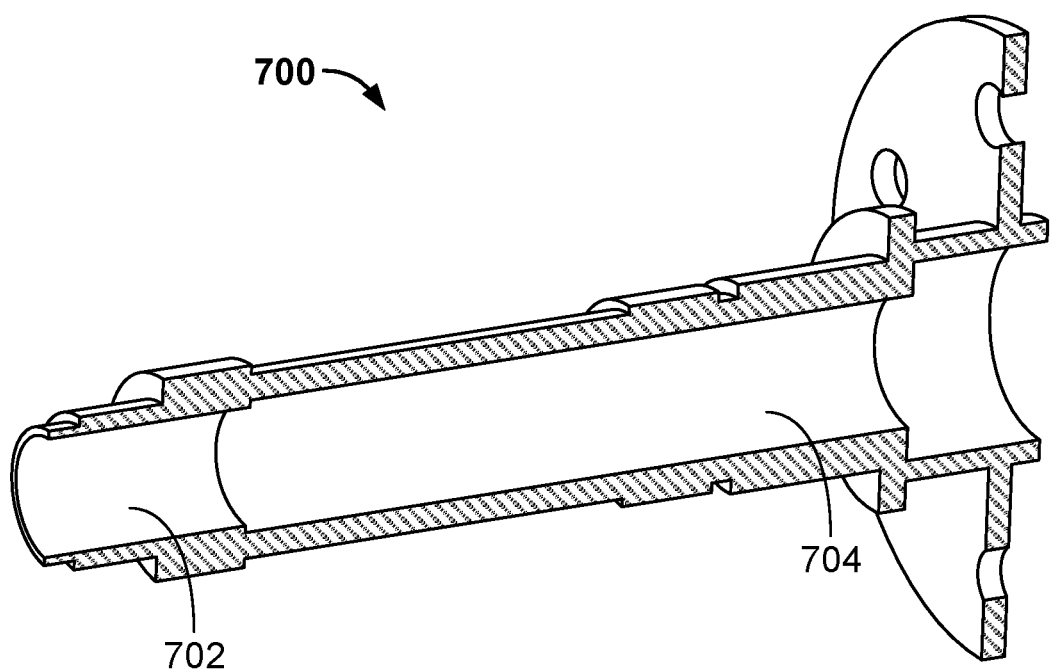
FIG. 7A is perspective cross-sectional view of a shaft for a modular motor assembly according to embodiments of the present disclosure.
Figure 7B:
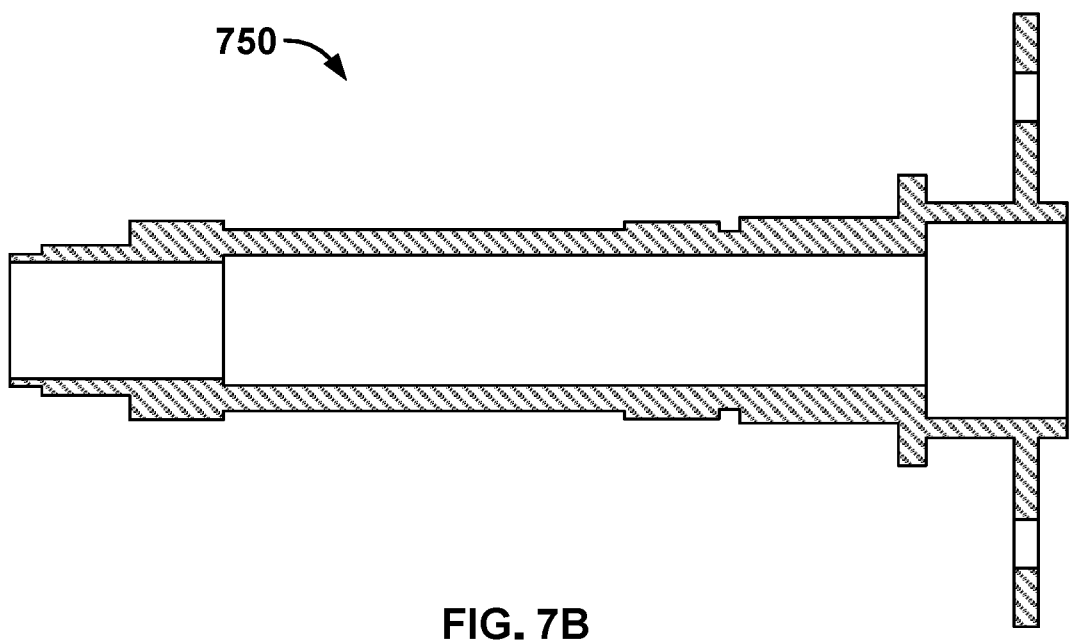
FIG. 7B is cross-sectional side view of a shaft for a modular motor assembly according to embodiments of the present disclosure.

FIG. 7A is perspective cross-sectional view of a shaft for a modular motor assembly according to embodiments of the present disclosure. FIG. 7B is cross-sectional side view of a shaft for a modular motor assembly according to embodiments of the present disclosure. The example shaft pictured in FIGS. 7A and 7B includes a plurality of segments. The segments may have varying diameters. Here, section 702 has a smaller diameter than section 704. This allows a shaft of variable cross section to be provided. A variable cross section may be suitable for relatively longer shafts. Longer shafts may more prone to flexing in the middle, for example, because magnetic units may be hollow in the middle. Flexing may be prevented or reduced by providing a larger cross section in the middle of the shaft. The length of the shaft and size of the cross section in the middle of the shaft can be sized according to application of the motor. A relatively long shaft or large cross-section is one with a relatively high ration of length to diameter/stiffness/section modulus.

FIG. 8 is a block diagram illustrating an embodiment of a motor and fan assembly 800 in which a modular motor is provided. The motor and fan assembly may be part of an aircraft such as multicopter 900 of FIG. 9. The assembly 800 includes cone 806, fan 804, and motor 802.

The motor 802 may power fan 804 to cause the fan 804 to spin and produce thrust. The number of magnetic units provided in the motor can be varied based on the aircraft's power requirements. For example, a light aircraft designed to carry a single passenger or a relatively light load may be adequately served by a motor having relatively few magnetic units. The magnetic units may provide the desired RPM or thrust. The cone 806 may be shaped to facilitate aerodynamics of the aircraft in which the assembly 800 is provided.

FIG. 9 is a block diagram illustrating an example of an aircraft in which a modular motor assembly is provided. Aircraft 900 is a multicopter that uses a modular motor assembly.

In the example shown, the multicopter 900 has two propulsion systems: a forward propulsion system 102 and a vertical propulsion system (not shown). The forward propulsion system 902 is used to propel the multicopter forward along a longitudinal (roll) axis. As shown here, the blades of the lift fans in the forward propulsion system 902 are oriented to rotate in a vertical plane.

The forward propulsion system 902 produces lift to keep the aircraft airborne in a manner similar to a fixed wing aircraft (e.g., where the forward propulsion of the multicopter causes airflow over and under the wings which in turn induces an aerodynamic force upwards on the bottom of the wings). In the exemplary multicopter, the fans of the forward propulsion system are implemented using modular motors (various embodiments of which are described herein).

In the vertical propulsion system, the blades of the lift fans are oriented to rotate in a horizontal plane. The vertical propulsion system is used to move (e.g., up or down) the aircraft along a vertical (yaw) axis. The vertical propulsion system produces lift in a manner similar to helicopters where the lift is produced by the airflow downwards.

In various embodiments, the shapes and/or pitch angles of the blades in the forward propulsion system 902 and vertical population system may be optimized for the specific type of flying (e.g., forward flight versus vertical flight).

While the multicopter is flying, one of the propulsion systems may be turned off (if desired) while the other propulsion system remains on. For example, if the multicopter 900 is flying forward at a constant altitude, then the vertical propulsion system may be turned off to conserve power and/or because the forward propulsion system 902 is more efficient at flying in this manner. Or, if the multicopter is hovering in-air at a constant position, the forward propulsion system 902 may be turned off.

Figure 10:
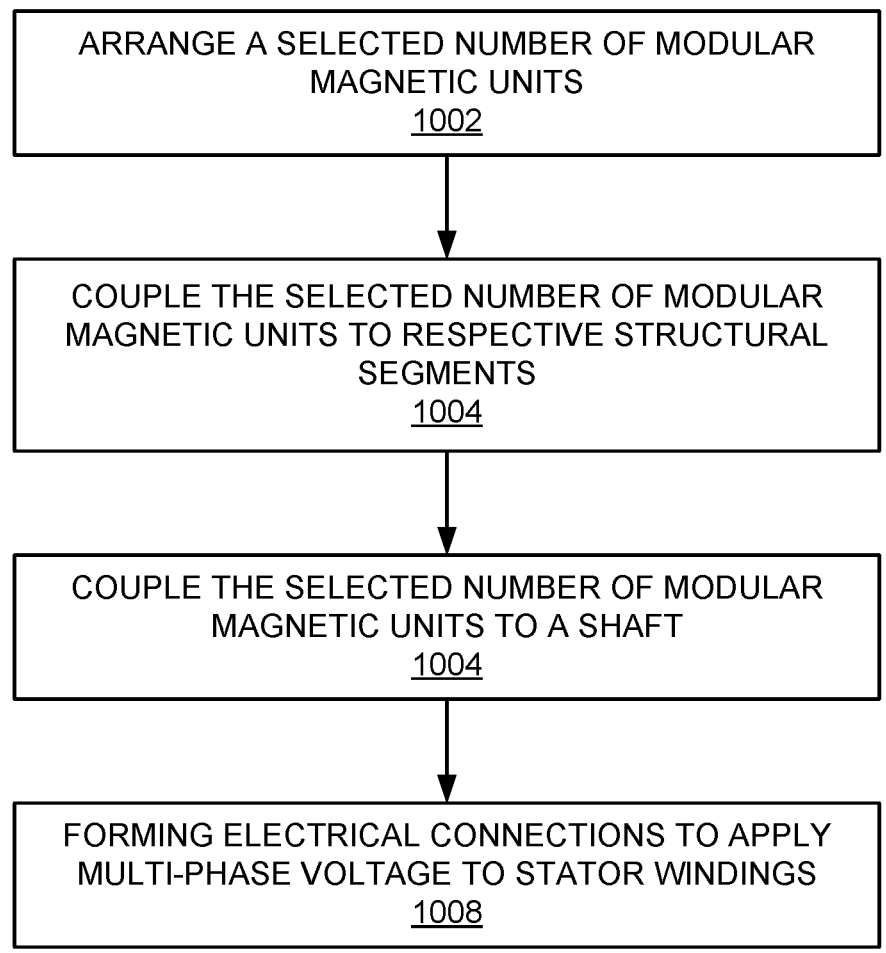
FIG. 10 is a flow chart illustrating an embodiment of a process for manufacturing a modular motor.

FIG. 10 is a flow chart illustrating an embodiment of a process for manufacturing a modular motor. This process may be implemented to facilitate assembly of the modular motor shown in FIG. 1.

In the example shown, the process begins by arranging a selected number of modular magnetic units (1002). The number of modular magnetic units may be selected according to a power requirement of a vehicle or device in which the motor is provided. In some embodiments, the modular magnetic units may be arranged manually and/or by a robotic arm. For example, six magnetic units may be suitable for some multicopter applications.

The process couples the selected number of modular magnetic units to respective structural segments (1004). The magnetic units may be coupled to structural segments that provide support for the magnetic units and facilitate integration of the magnetic units. For example, a structural segments may be a ring that can be fitted around a magnetic unit to provide support for the stator of the magnetic unit. Adjacent structural segments may be coupled to each other to form a canister containing the selected number of modular magnetic units.

The process couples the selected number of modular magnetic units to a shaft (1006). In some embodiments, all of the magnetic units are coupled to the shaft. In some embodiments, a select few such as the end magnetic units are coupled to the shaft. This may facilitate removal of magnetic units because they can be de-coupled from adjacent magnetic units without needing to also remove them from the shaft. For example, a motor can be easily adapted from one application to another by removing or adding magnetic units depending on whether power requirements increase or decrease from one application to the next. Although this example is described with the order of structural coupling followed by shaft coupling, these steps can be performed in any order.

The process forms electrical connections to apply multiphase voltage to stator windings of modular magnetic units (1008). In various embodiments, pre-made buses or bars may be used to make the connections. The types and numbers of buses or bars used may be determined by a number of magnetic units in the stack. In various embodiments, magnets forming a magnet array in the modular magnetic units have optimally oriented magnetization directions throughout the magnets. For example, the sintered grains of the magnet cause the magnet to have a magnetic field like that of a Halbach array.

The modular motor assembly described herein finds application in various aircraft including forward propulsion systems. For example, a modular motor (sometimes called a "stackable motor") has an interlocking design, variable length shaft, and the ability to have a variable number of layers to accommodate different loads or vehicles. The modular motor assembly described herein can be easily adapted for varying power requirements by using different numbers of magnetic units, structural segments, and/or shaft spacers. For example, the number of modular parts used can be varied based on needed RPM, torque, and the like. Parts unique to a configuration can be reduced and/or eliminated, thus simplifying and reducing the cost of manufacture and maintenance of a motor.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A motor comprising:
a first modular magnetic assembly comprising a first rotor assembly and a first stator assembly operable to magnetically induce rotation of the first rotor assembly around a motor axis;
a first stator housing to which the first stator assembly is detachably mounted;

a second modular magnetic assembly comprising a second rotor assembly and a second stator assembly operable to magnetically induce rotation of the second rotor assembly around the motor axis;

a second stator housing to which the second stator assembly is detachably mounted;

a third stator housing configured for detachable mounting of a third modular magnetic assembly comprising a third rotor assembly and a third stator assembly operable to magnetically induce rotation of the third rotor assembly around the motor axis, wherein the third stator housing is coupled with and between the first stator housing and the second stator housing to form an annular canister defining an interior space in which the first modular magnetic assembly and the second modular magnetic assembly are disposed; and a shaft assembly comprising a shaft and a shaft spacer, wherein the first rotor assembly and the second rotor assembly are rotationally coupled to the shaft for rotation with the shaft around the motor axis, wherein the shaft spacer maintains a separation distance between the first rotor assembly and the second rotor assembly parallel to the motor axis, wherein the separation distance is sized to accommodate installation of the third modular magnetic assembly between the first modular magnetic assembly and the second modular magnetic assembly after removal of the shaft spacer.

2. The motor of claim 1, wherein the first stator housing, the second stator housing, and the third stator housing are identically configured.

3. The motor of claim 1, further comprising a fourth stator housing configured for detachable mounting of a fourth modular magnetic assembly comprising a fourth rotor assembly and a fourth stator assembly operable to magnetically induce rotation of the fourth rotor assembly around the motor axis, wherein the fourth stator housing is coupled with and between the first stator housing and the second stator housing to form the annular canister, and wherein the separation distance is sized to accommodate installation of the fourth modular magnetic assembly between the first modular magnetic assembly and the second modular magnetic assembly after removal of the shaft spacer.

4. The motor of claim 3, further comprising a fifth stator housing configured for detachable mounting of a fifth modular magnetic assembly comprising a fifth rotor assembly and a fifth stator assembly operable to magnetically induce rotation of the fifth rotor assembly around the motor axis, wherein the fifth stator housing is coupled with and between the first stator housing and the second stator housing to form the annular canister, and wherein the separation distance is sized to accommodate installation of the fifth modular magnetic assembly between the first modular magnetic assembly and the second modular magnetic assembly after removal of the shaft spacer.

5. The motor of claim 4, wherein the third stator housing, the fourth stator housing and the fifth stator housing are identically configured.

6. The motor of claim 1, wherein:

the first stator assembly comprises a first stator electrical connector that extends through a first stator electrical connector aperture through the annular canister, wherein the first stator electrical connector aperture is at least partially defined by the first stator housing; and the second stator assembly comprises a second stator electrical connector that extends through a second stator electrical connector aperture through the annular canister, wherein the second stator electrical connector aperture is partially defined by the second stator housing.

7. A motor comprising:

a shaft mounted to rotate around a motor axis;

a first modular magnetic assembly comprising a first upper rotor assembly, a first lower rotor assembly and a first stator assembly, wherein the first upper rotor assembly comprises a first upper rotor housing and a first upper magnet array, wherein the first upper rotor housing is rotationally coupled to the shaft, wherein the first upper magnet array is mounted to the first upper rotor housing, wherein the first lower rotor assembly comprises a first lower rotor housing and a first lower magnet array, wherein the first lower rotor housing is rotationally coupled to the shaft, wherein the first lower magnet array is mounted to the first lower rotor housing, wherein the first stator assembly comprises a first stator wire winding configured to generate a first magnetic field that interacts with the first upper magnet array to produce a first upper torque and interacts with the first lower magnet array to produce a first lower torque, wherein the first upper torque is transmitted to the shaft by the first upper rotor housing, and wherein the first lower torque is transmitted to the shaft by the first lower rotor housing;

a first structural segment to which the first stator assembly is detachably mounted;

a second modular magnetic assembly comprising a second upper rotor assembly, a second lower rotor assembly and a second stator assembly, wherein the second upper rotor assembly comprises a second upper rotor housing and a second upper magnet array, wherein the second upper rotor housing is rotationally coupled to the shaft, wherein the second upper magnet array is mounted to the second upper rotor housing, wherein the second lower rotor assembly comprises a second lower rotor housing and a second lower magnet array, wherein the second lower rotor housing is rotationally coupled to the shaft, wherein the second lower magnet array is mounted to the second lower rotor housing, wherein the second stator assembly comprises a second stator wire winding configured to generate a second magnetic field that interacts with the second upper magnet array to produce a second upper torque and interacts with the second lower magnet array to produce a second lower torque, wherein the second upper torque is transmitted to the shaft by the second upper rotor housing, and wherein the second lower torque is transmitted to the shaft by the second lower rotor housing;

a second structural segment to which the second stator assembly is detachably mounted; and an annular canister defining an interior space in which the first modular magnetic assembly and the second modular magnetic assembly are disposed, wherein the annular canister comprises the first structure segment and the second structural segment.

8. The motor of claim 7, wherein:

the first structural segment is configured to interlock with the second structural segment or a third structural segment to form a first portion of the annular canister that defines a first portion of the interior space in which the first modular magnetic assembly is disposed.

9. The motor of claim 7, wherein each of the first upper magnet array, the first lower magnet array, the second upper magnet array and the second lower magnet array has an annular disk shape.

10. The motor of claim 9, wherein each of the first upper magnet array, the first lower magnet array, the second upper magnet array and the second lower magnet array comprises a Halbach array.

11. The motor of claim 7, further comprising:
a first end modular magnetic assembly comprising a first end rotor assembly and a first end stator assembly, wherein the first end rotor assembly comprises a first end rotor housing and a first end magnet array, wherein the first end rotor housing is rotationally coupled to the shaft, wherein the first end magnet array is mounted to the first end rotor housing, wherein the first end stator assembly comprises a first end stator wire winding configured to generate a first end magnetic field that interacts with the first end magnet array to produce a first end torque, wherein the first end torque is transmitted to the shaft by the first end rotor housing;
a first end structural segment to which the first end stator assembly is detachably mounted;
a second end modular magnetic assembly comprising a second end rotor assembly and a second end stator assembly, wherein the second end rotor assembly comprises a second end rotor housing and a second end magnet array, wherein the second end rotor housing is rotationally coupled to the shaft, wherein the second end magnet array is mounted to the second end rotor housing, wherein the second end stator assembly comprises a second end stator wire winding configured to generate a second end magnetic field that interacts with the second end magnet array to produce a second end torque, wherein the second end torque is transmitted to the shaft by the second end rotor housing; and
second end structural segment to which the second end stator assembly is detachably mounted, and
wherein the first modular magnetic assembly and the second modular magnetic assembly are disposed between the first end rotor assembly and the second end rotor assembly.

12. A motor comprising:
a first modular magnetic assembly comprising a first rotor assembly and a first stator assembly operable to magnetically induce rotation of the first rotor assembly around a motor axis, wherein the first stator assembly comprises three or more first stator assembly coupling features distributed circumferentially around the first stator assembly;
a first stator housing comprising three or more first stator housing stator coupling features and three or more first stator housing inter-coupling features, wherein each of the first stator housing stator coupling features is adapted to be interfaced with a respective one of the first stator assembly coupling features for transfer of torque around the motor axis from the first stator assembly to the first stator housing;
a second modular magnetic assembly comprising a second rotor assembly and a second stator assembly operable to magnetically induce rotation of the second rotor assembly around the motor axis, wherein the second stator assembly comprises three or more second stator assembly coupling features distributed circumferentially around the second stator assembly; and
a second stator housing comprising three or more second stator housing stator coupling features and three or more second stator housing inter-coupling features, wherein each of the second stator housing stator coupling features is adapted to be interfaced with a respective one of the second stator assembly coupling features for transfer of torque around the motor axis from the second stator assembly to the second stator housing,
wherein the first stator housing is coupled with the second stator housing to form an annular canister defining an interior space in which the first modular magnetic assembly and the second modular magnetic assembly are disposed, and
wherein respective pairs of one of the first stator housing inter-coupling features and one of the second stator housing inter-coupling features are inter-coupled to couple the first stator housing with the second stator housing.

13. The motor of claim 12, wherein:
the first stator assembly comprises six or more of the first stator assembly coupling features distributed circumferentially around the first stator assembly;
the first stator housing comprises six or more of the first stator housing stator coupling features;
the second stator assembly comprises six or more of the second stator assembly coupling features distributed circumferentially around the second stator assembly; and
the second stator housing comprises six or more of the second stator housing stator coupling features.

14. The motor of claim 12, wherein each respective interfacing pair of the first stator assembly coupling features and the first stator housing stator coupling features and each respective interfacing pair of the second stator assembly coupling features and the second stator housing stator coupling features comprises a protruding pin aligned parallel with the motor axis and a receptacle shaped to accommodate and interface with the protruding pin.

15. The motor of claim 12, wherein each of the first stator housing inter-coupling features and each of the second stator housing inter-coupling features comprises a pinhole aligned parallel with the motor axis for receiving a respective connection pin that forms a connection between the first stator housing and the second stator housing.

16. The motor of claim 12, wherein each of the first stator housing inter-coupling features and a respective one of the first stator housing stator coupling features are adjacently disposed and centered on a respective plane on which the motor axis is coplanar.

17. The motor of claim 12, wherein:
the first stator housing has a recessed edge that at least partially defines an aperture in the annular canister through which an electrical connector portion of the first stator assembly extends; and
the second stator housing has a recessed edge that at least partially defines an aperture in the annular canister through which an electrical connector portion of the second stator assembly extends.

* * * * *